US008630255B1

(12) United States Patent
Kunz et al.

(10) Patent No.: US 8,630,255 B1
(45) Date of Patent: Jan. 14, 2014

(54) WIRELESS ADAPTER WITH AUXILIARY RADIO CHANNEL FOR ADVANCED CHANNEL SCANNING

(75) Inventors: Manfred Kunz, Rastatt (DE); Joachim Schmalz, Bischweier (DE)

(73) Assignee: Marvell International Ltd., Hamilton (BM)

( * ) Notice: Subject to any disclaimer, the term of this patent is extended or adjusted under 35 U.S.C. 154(b) by 1388 days.

(21) Appl. No.: 11/901,435

(22) Filed: Sep. 17, 2007

Related U.S. Application Data

(60) Provisional application No. 60/826,130, filed on Sep. 19, 2006.

(51) Int. Cl.
*H04W 36/08* (2009.01)
*H04W 4/00* (2009.01)
*H04J 3/16* (2006.01)

(52) U.S. Cl.
USPC ........... 370/331; 370/338; 370/346; 370/255; 455/434; 455/436; 455/562.1

(58) Field of Classification Search
USPC ...................................................... 370/338
See application file for complete search history.

(56) References Cited

U.S. PATENT DOCUMENTS

| | | | |
|---|---|---|---|
| 6,047,175 A | 4/2000 | Trompower | 455/422 |
| 7,706,326 B2 * | 4/2010 | Marinier et al. | 370/331 |
| 7,907,564 B2 * | 3/2011 | Laux et al. | 370/329 |
| 7,969,920 B2 * | 6/2011 | Wentink | 370/278 |
| 8,054,798 B2 * | 11/2011 | Jeong et al. | 370/331 |
| 8,467,785 B2 * | 6/2013 | Montemurro et al. | 455/434 |
| 2004/0180626 A1 * | 9/2004 | Chauvin et al. | 455/67.11 |
| 2005/0227631 A1 * | 10/2005 | Robinett | 455/83 |
| 2005/0255847 A1 * | 11/2005 | Han et al. | 455/436 |
| 2006/0023686 A1 * | 2/2006 | Jeong et al. | 370/338 |
| 2006/0029023 A1 * | 2/2006 | Cervello et al. | 370/333 |
| 2006/0079232 A1 * | 4/2006 | Omori et al. | 455/436 |
| 2006/0089138 A1 * | 4/2006 | Smith et al. | 455/426.1 |
| 2006/0116127 A1 * | 6/2006 | Wilhoite et al. | 455/442 |
| 2006/0187873 A1 | 8/2006 | Friday et al. | 370/328 |
| 2006/0268756 A1 | 11/2006 | Wang et al. | 370/310 |
| 2007/0177549 A1 * | 8/2007 | Lo et al. | 370/331 |

OTHER PUBLICATIONS

Brik et al, "Eliminating handoff Latencies in 802.11 WLANs using Multiple Radios: Applications, Experience, and Evaluation," 2005, USENIX Association, pp. 299-301.*
V. Brik, et al., "Eliminating Handoff Latencies in 802.11 WLANs Using Multiple Radios: Applications, Experience, and Evaluation", Proceedings of the 5th Conference on Internet Measurement, pp. 299-304 (Oct. 2005).

* cited by examiner

*Primary Examiner* — Kwang B Yao
*Assistant Examiner* — Candal Elpenord

(57) ABSTRACT

A wireless device for wireless communication in a wireless area network. The wireless device includes a main radio channel for exchanging data with an access point in the wireless area network, as well as an auxiliary radio channel for scanning for availability of other access points in the wireless area network.

10 Claims, 8 Drawing Sheets

| CONFIGURABLE CHANNEL LIST ||| 
|---|---|---|
| CHANNEL NUMBER 22 | SCAN ENABLED 23 | LISTEN TIME 24 |
| 1 | YES | 100 ms |
| 2 | YES | 200 ms |
| 3 | NO | — |
| ⋮ | | |

CONFIGURABLE CHANNEL LIST 21

| CHANNEL NUMBER 22 | SCAN ENABLED 23 | LISTEN TIME 24 |
|---|---|---|
| 1 | YES | 100 ms |
| 2 | YES | 200 ms |
| 3 | NO | — |
| ⋮ | | |

FIG. 4

CHANNEL DATABASE 31

| CHANNEL NUMBER 32 | USABLE FRAMES PRESENT 33 | CAPABILITY 34 | SSID 35 | QUALITY OF SERVICE 36 |
|---|---|---|---|---|
| 1 | YES | 802.11 b/g | | |
| 2 | NO | | | |
| 3 | | | | |
| ⋮ | | | | |

FIG. 5

WIRELESS ADAPTER WITH AUXILIARY RADIO CHANNEL FOR ADVANCED CHANNEL SCANNING

CROSS-REFERENCE TO RELATED APPLICATION

This application claims the benefit of U.S. Provisional Patent Application No. 60/826,130, filed Sep. 19, 2006, the contents of which are hereby incorporated by reference as if fully stated herein.

FIELD OF THE INVENTION

The present invention relates to an adapter for a wireless network, and particularly to such an adapter that includes an auxiliary, redundant radio channel for advanced channel scanning.

BACKGROUND OF THE INVENTION

FIG. 1 is a simplified view of a representative wireless local area network (WAN) which includes multiple access points (AP1, AP2 and AP3) that provide access to a wired network or LAN 2 through a switch 3. The access points are arranged for overlapped geographic coverage of the WAN, and each access point typically uses a communication channel independent and distinct from the communication channels of other access points in the WAN.

A mobile device 4 operates within the coverage area of the WAN. With respect to the needs of an end user, the primary responsibility of mobile device 4 is to exchange data wirelessly with an access point (such as AP2 in FIG. 1) over the channel on which the access point is operating.

From the perspective of mobile device 4, however, the mobile device has additional responsibilities. Primary among these is to maintain good communications as the mobile device moves around the coverage area of the WAN. For example, as mobile device 4 moves out of the coverage area of AP2, as depicted by the dotted arrow in FIG. 1, toward the coverage area of AP3, mobile device 4 must initiate appropriate hand-off procedures so as to continue to exchange data over the WAN even though data communications has switched from communications with AP2 over a first channel to communications with AP3 over a second channel.

A typical hand-off procedure involves three phases: a discovery phase, a search phase, and an execution phase. Briefly, in the discovery phase, mobile device 4 monitors the quality of communications with its current access point, to determine whether to enter into the search and execution phases. In the search phase, mobile device 4 searches for the availability of other access points. The search phase might be accomplished passively (for example, by listening for broadcasts on other channels), actively (for example, by exchanging probes with access points on other channels), or through receipt of a site report from the current access point (pursuant to IEEE 802.11 (k)). In the execution phase, mobile device 4 decides whether other access points would provide better communications than the current access point, and switches communication to the other access point if appropriate.

These activities detract from the ability of mobile device 4 to engage in data exchange with its current access point. For example, during the search phase, if a passive search is performed, mobile device 4 temporarily halts data exchange with its current access point, switches to another channel, and listens on the other channel for beacons and other identifying information from other access points. Typically, this listening time might be on the order of around 100 msec for each other channel. Accordingly, it is possible for many tenths of a second to be spent in passive listening, and many tenths of a second to pass before mobile device 4 returns to its data exchange responsibilities.

SUMMARY OF THE INVENTION

The present invention addresses the foregoing disadvantageous situation in the prior art, through the provision of a wireless adapter that includes an auxiliary radio channel which scans for other access points. Because there is an auxiliary radio channel, the main radio channel of the wireless adapter is free to continue data exchange over the WAN, ordinarily without interruption by the need to scan for other access points in the WAN coverage area.

Thus, in one aspect, the invention is a wireless device that includes a main radio channel for transmission and reception of data to and from an access point pursuant to a wireless standard that defines a protocol for data transmission and reception. The wireless device further includes an auxiliary radio channel for scanning for other access points, pursuant to a scanning protocol of the wireless standard.

In one further aspect, the transmission and reception activities of the main radio channel proceed simultaneously with the scanning activities of the auxiliary radio channel, in the sense that one activity does not interrupt the other.

In further aspects, the auxiliary radio channel scans pursuant to a configurable channel list, which is configurable to designate which channels should and should not be scanned. The wireless device maintains a database of scanning results, and updates the database in accordance with scanning activities. The database may be supplied to a host device upon request, so that the host device can determine quickly the target access point during a hand-off procedure, such as when the mobile device is moved.

The auxiliary radio channel may be a receive-only radio channel, in which case scanning activities are passive. Alternatively, the auxiliary radio channel may include transmit and receive capabilities, in which case scanning may include active scans. In addition, if the mobile device includes transmit and receive capabilities, then the mobile device may use the transmit capabilities so as to obtain pre-authorization for communication with other access points.

The invention contemplates device, apparatus, means, process, stored program code, method and so forth, as described herein.

This brief summary has been provided so that the nature of the devices and methods described herein may be understood quickly. A more complete understanding of the invention can be obtained by reference to the following detailed description of one embodiment thereof in connection with the attached drawings.

BRIEF DESCRIPTION OF THE DRAWINGS

FIG. 4 is a view showing the content of a configurable channel list according to the FIG. 3 embodiment of the invention.

FIG. 5 is a view showing the content of a channel base according to the FIG. 3 embodiment of the invention.

DETAILED DESCRIPTION OF THE PREFERRED EMBODIMENT

Figure 1:
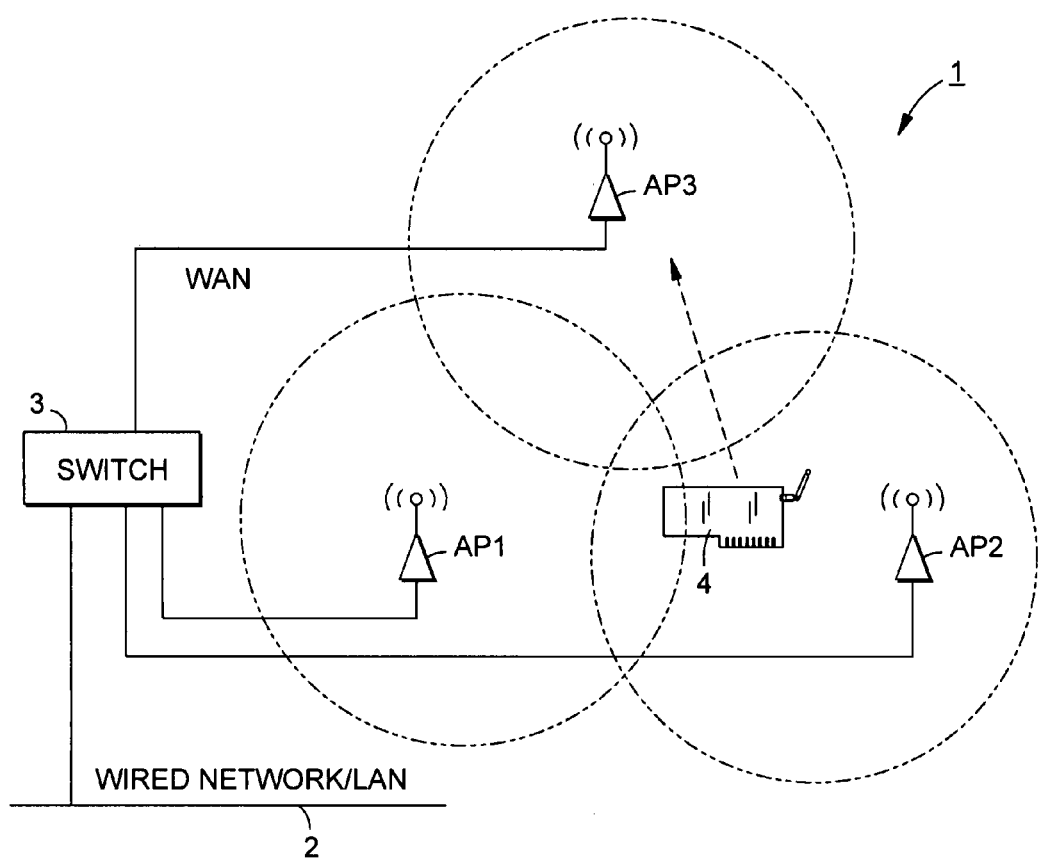
FIG. 1 is a view depicting a representative wireless area network (WAN) and a conventional mobile device operating within the coverage area of the WAN.
Figure 2:
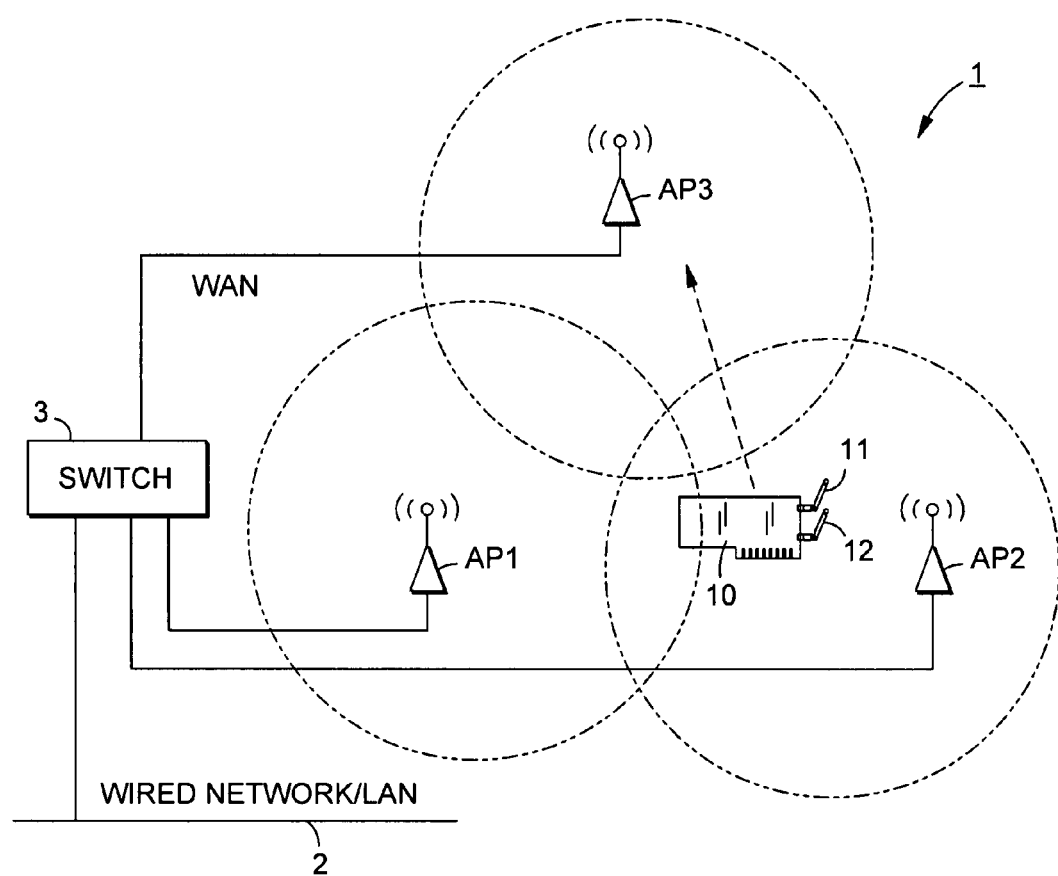
FIG. 2 depicts a mobile device according to the present invention, operating within the coverage area of a WAN.

FIG. 2 shows a mobile device 10 according to a first embodiment of the invention. Mobile device 10 includes main antenna 11 for a main radio channel, and auxiliary antenna 12 for an auxiliary channel. Mobile device 10 operates inside the same types of wireless area networks (WANs) as that depicted in FIG. 1. Typically, mobile device 10 operates ordinarily without any change to existing WANs, and it can also operate in the presence of conventional mobile devices such as mobile device 4 of FIG. 1. A fuller description of WAN 1 shown in FIG. 2 is omitted in the interest of brevity.

Main antenna 11 is provided for a main radio channel that transmits and receives data over a data communication channel to and from an access point, such as AP2, with which mobile device 10 currently communicates. Data communication is carried out pursuant to a data transmission and reception protocol of an applicable wireless standard, such as IEEE 802.11(a), (b) or (g), the content of which is incorporated by reference.

Auxiliary antenna 12 is provided for an auxiliary radio channel which scans for other access points, such as access point AP1 and AP3, pursuant to a scanning protocol of the applicable wireless standard. In this embodiment, the data transmission and reception activities of the main radio channel proceed simultaneously with the scanning activities of the auxiliary radio channel, and the scanning activities of the auxiliary radio channel do not interfere with the transmission and reception activities of the main radio channel.

Figure 3:
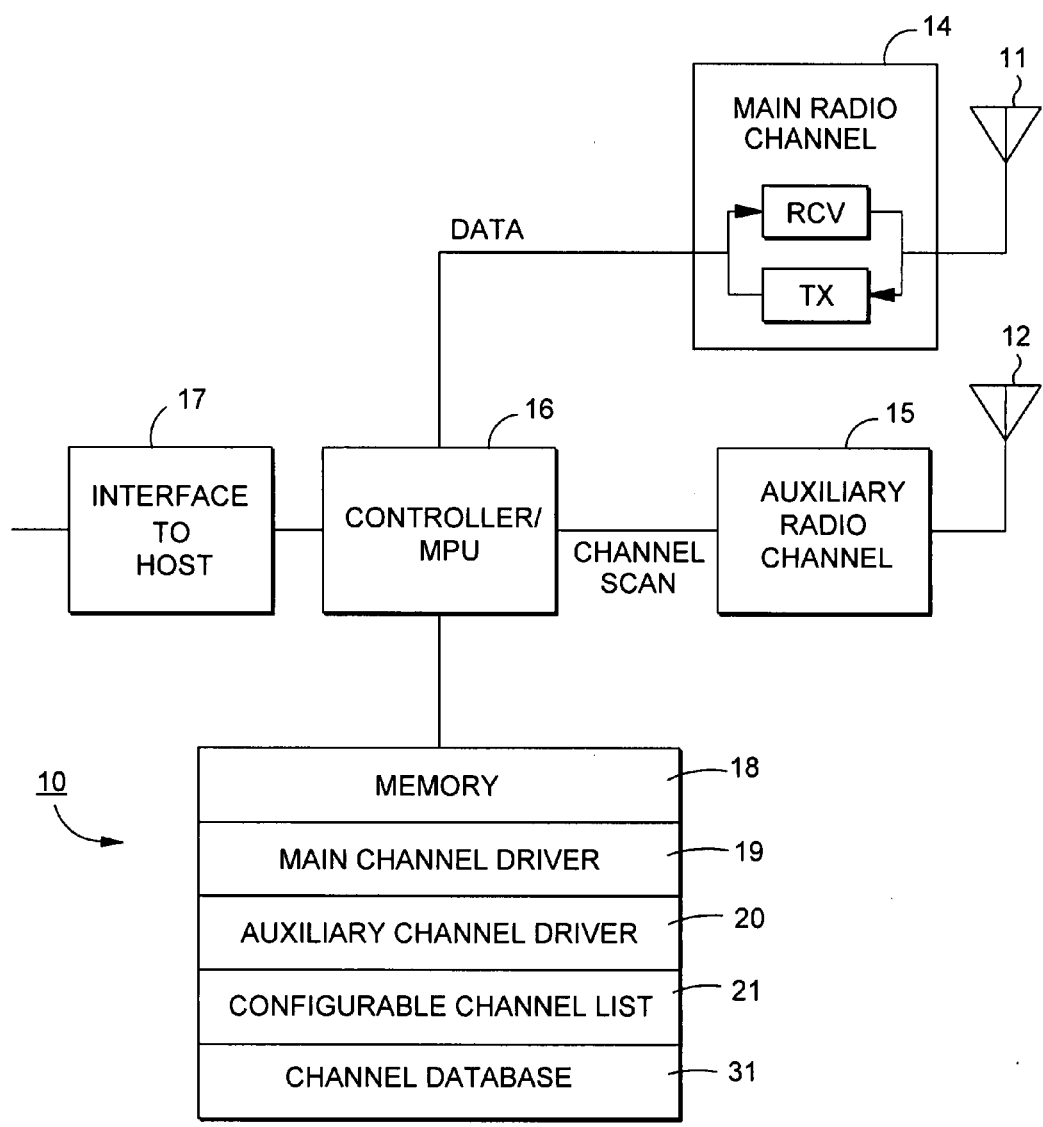
FIG. 3 is a block diagram showing the internal construction of a mobile device according to one embodiment of the invention.

FIG. 3 is a block diagram depicting the internal structure of mobile device 10. As seen in FIG. 3, mobile device 10 includes the aforementioned main antenna 11 and auxiliary antenna 12, which are respectively provided for main radio channel 14 and auxiliary radio channel 15. As shown in FIG. 3, the main radio channel 14 is separate from the auxiliary radio channel 15. The main radio channel 14 and auxiliary channel 15 are operated under control of controller/MPU 16, which communicates to a host device via interface 17. The host device may be a computer or laptop computer, a mobile device, personal digital assistant, cell phone, or any suitable host device for which wireless communication capability is desired. The interface may be a permanent connection or may be a disconnectable connector such as a PCI connector.

Main radio channel 14 is responsible for exchange of data between mobile device 10 and an access point, over a channel currently being used by the access point. Thus, main radio channel 14 includes both receive and transmit capabilities. Data is exchanged with the access point pursuant to a protocol in a wireless standard which defines how data is transmitted and received.

Auxiliary radio channel 15 is responsible for scanning for the availability of other access points in the current coverage area of mobile device 10. Scanning is carried out pursuant to a scanning protocol of the same wireless standard with which main radio channel 14 exchanges data. In this embodiment, auxiliary radio channel 15 performs passive scanning for other access points. Accordingly, auxiliary radio channel 15 seen in FIG. 3 includes receive-only capabilities and does not include a transmitter, although different arrangements are possible. Auxiliary radio channel 15 thus searches for the availability of other access points by passive listening on other channels for a pre-designated listening time, during which auxiliary radio channel 15 listens for beacons and other identifying information from other access points. Either the periodicity for listening and/or the listening time interval may be configurable.

Because the auxiliary channel 15 scans passively, its antenna 12 may be physically smaller than antenna 11. It is also possible that antenna 12 is completely enclosed in the packaging of mobile device 10.

It is further possible to arrange circuitry in mobile device 10 so that antennas 11 and 12 are switched in their functionality, specifically, so that antenna 12 is switched for use by main radio channel 14 and antenna 11 is switched for use with auxiliary radio channel 15.

Mobile device 10 further includes a memory 18, which may include any suitable combination of read only memory, programmable read only memory and/or random access memory. Memory 18 stores software code for operation of the mobile device, such as driver 19 for main radio channel 14, and driver 20 for operation of auxiliary radio channel 15. These are typically implemented as firmware although other manners of implementation (such as software or hardware) may be used. In addition, memory 18 includes a configurable channel list 21, and a channel database 31, whose contents are described below in connection with FIGS. 4 and 5, respectively.

FIG. 4 shows an example of the content of configurable channel list 21. Channel list 21 is configurable, such as being configurable through controller/MPU 16 by the host over interface 17. The channel list controls how auxiliary radio channel 15 scans for the availability of other access points on other channels. In this example, the channel list includes a list of channel numbers 22, together with a designation 23 as to whether a scan is enabled for each particular channel. In addition, since in this example the auxiliary radio channel 15 scans for other channels via a passive searching technique, the configurable channel list includes a listen time 24 which controls the amount of time that auxiliary radio channel 15 listens for beacons and other information on each particular channel. Configurable channel list 21 may also include an indication of the time period between performance of a listening operation, although this often can be omitted since such a time period can be pre-designated or fixed, for example, because of requirements in a standard.

Pursuant to the result of the scanning operations of auxiliary radio channel 15, controller/MPU 16 updates channel database 31. FIG. 5 depicts an example of the content of channel database 31. As shown in FIG. 5, the channel database includes a list of channel numbers 32 together with an indication 33 as to whether usable frames are present on this channel. If additional information is obtained by auxiliary radio channel 15, then this information is included in channel database 31. For example, channel database 31 might include capability information 34 concerning the capability of the access point on a particular channel or operating standard, the service set identification (SSID) of the access point (designated at reference numeral 35), and a quality of service indicator 36. All, some or none of this information may be provided for any given channel.

Upon request from the host, controller/MPU 16 provides the channel database to the host. This permits the host to decide quickly on the availability of other access points, in a situation where a handoff to another access point is contemplated.

Although the embodiment of FIG. 3 depicts an auxiliary radio channel 15 that is passive, the invention also contemplates auxiliary radio channels that are active, in the sense that the auxiliary radio channel includes both transmission and receiving capabilities. Whether or not such active scanning capabilities are actually executed is a configurable option as part of the configurable channel list 21 (for example). In the case that auxiliary radio channel 15 includes both transmission and receiving capabilities, then the channel database may include further information, which might not ordinarily be obtainable during passive scanning, such as authorization information. In addition, auxiliary radio channel 15 may pre-authorize the mobile device for communications with other access points. The current status of such pre-authorization is a further field (not shown) for inclusion in channel database 31.

Referring now to FIGS. 6A-6G, various exemplary implementations of the present invention are shown. In each figure, two antennas are shown, respectively corresponding to the main radio channel and the auxiliary radio channel.

Figure 6A:
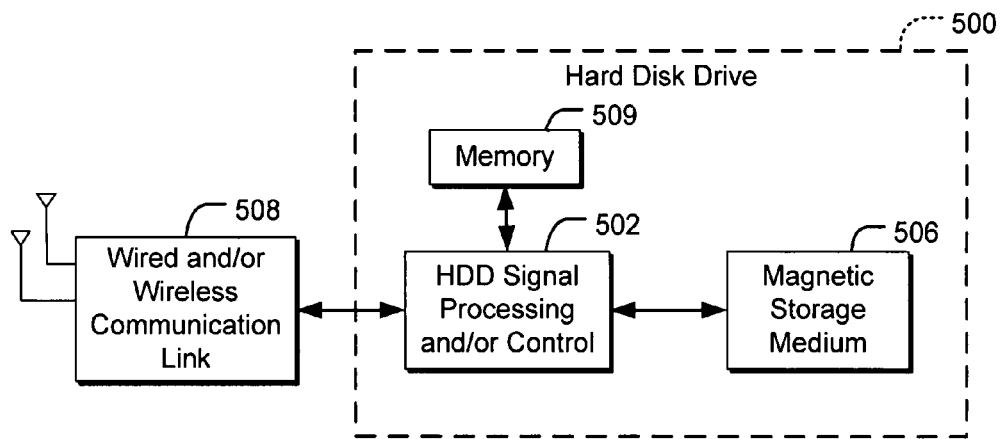
FIG. 6A is a block diagram showing an embodiment of the invention in a hard disk drive.

Referring to FIG. 6A, the present invention may be embodied as a wireless device in a hard disk drive 500. The present invention may implement either or both signal processing and/or control circuits, which are generally identified in FIG. 6A at 502. In some implementations, signal processing and/or control circuit 502 and/or other circuits (not shown) in HDD 500 may process data, perform coding and/or encryption, perform calculations, and/or format data that is output to and/or received from a magnetic storage medium 506.

HDD 500 may communicate with a host device (not shown) such as a computer, mobile computing devices such as personal digital assistants, cellular phones, media or MP3 players and the like, and/or other devices via one or more wired or wireless communication links 508. HDD 500 may be connected to memory 509, such as random access memory (RAM), a low latency nonvolatile memory such as flash memory, read only memory (ROM) and/or other suitable electronic data storage.

Figure 6B:
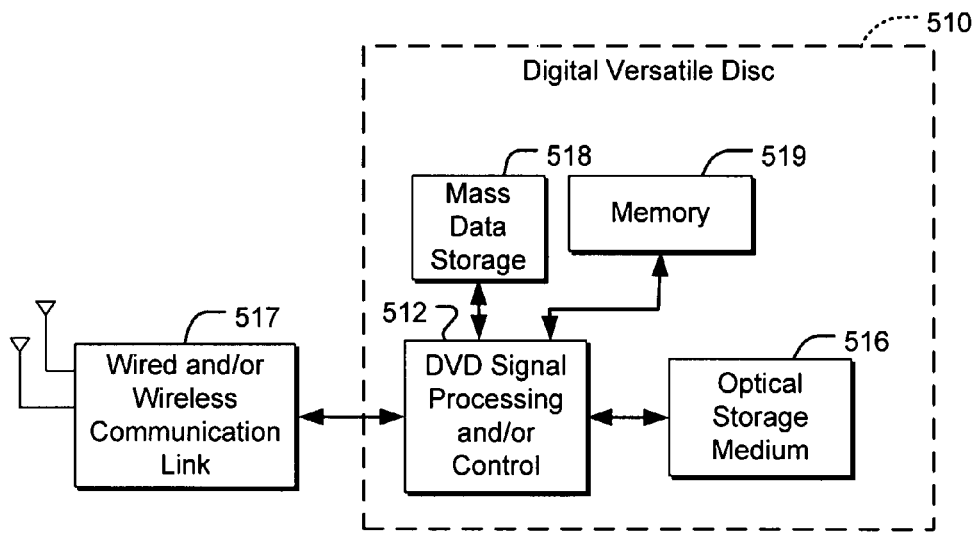
FIG. 6B is a block diagram showing an embodiment of the invention in a DVD drive.

Referring now to FIG. 6B, the present invention may be embodied as a wireless device in a digital versatile disc (DVD) drive 510. The present invention may implement either or both signal processing and/or control circuits, which are generally identified in FIG. 6B at 512, and/or mass data storage 518 of DVD drive 510. Signal processing and/or control circuit 512 and/or other circuits (not shown) in DVD 510 may process data, perform coding and/or encryption, perform calculations, and/or format data that is read from and/or data written to an optical storage medium 516. In some implementations, signal processing and/or control circuit 512 and/or other circuits (not shown) in DVD 510 can also perform other functions such as encoding and/or decoding and/or any other signal processing functions associated with a DVD drive.

DVD drive 510 may communicate with an output device (not shown) such as a computer, television or other device via one or more wired or wireless communication links 517. DVD 510 may communicate with mass data storage 518 that stores data in a nonvolatile manner. Mass data storage 518 may include a hard disk drive (HDD) such as that shown in FIG. 6A. The HDD may be a mini HDD that includes one or more platters having a diameter that is smaller than approximately 1.8". DVD 510 may be connected to memory 519, such as RAM, ROM, low latency nonvolatile memory such as flash memory, and/or other suitable electronic data storage.

Figure 6C:
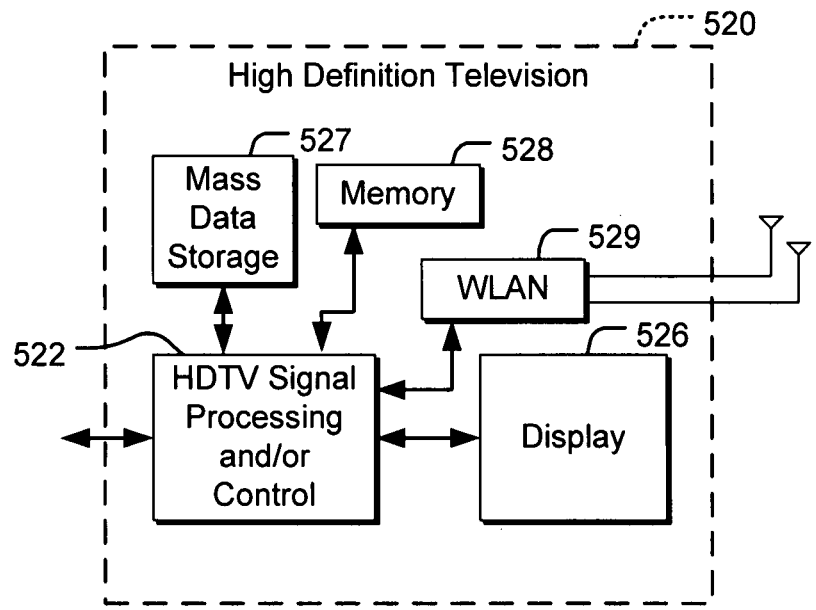
FIG. 6C is a block diagram showing an embodiment of the invention in a high definition television (HDTV).

Referring now to FIG. 6C, the present invention may be embodied as a wireless device in a high definition television (HDTV) 520. The present invention may implement either or both signal processing and/or control circuits, which are generally identified in FIG. 6C at 522, a WLAN interface and/or mass data storage of the HDTV 520. HDTV 520 receives HDTV input signals in either a wired or wireless format and generates HDTV output signals for a display 526. In some implementations, signal processing circuit and/or control circuit 522 and/or other circuits (not shown) of HDTV 520 may process data, perform coding and/or encryption, perform calculations, format data and/or perform any other type of HDTV processing that may be required.

HDTV 520 may communicate with mass data storage 527 that stores data in a nonvolatile manner such as optical and/or magnetic storage devices. At least one HDD may have the configuration shown in FIG. 6A and/or at least one DVD may have the configuration shown in FIG. 6B. The HDD may be a mini HDD that includes one or more platters having a diameter that is smaller than approximately 1.8". HDTV 520 may be connected to memory 528 such as RAM, ROM, low latency nonvolatile memory such as flash memory and/or other suitable electronic data storage. HDTV 520 also may support connections with a WLAN via a WLAN network interface 529.

Figure 6D:
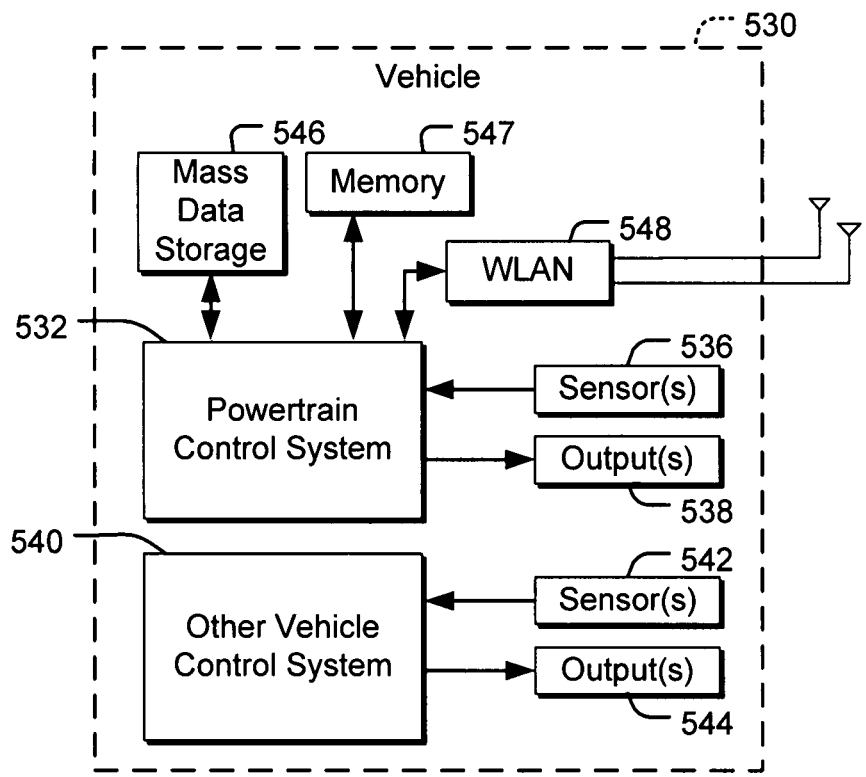
FIG. 6D is a block diagram showing an embodiment of the invention in a vehicle control system.

Referring now to FIG. 6D, the present invention may be embodied as a wireless device in a control system of a vehicle 530, a WLAN interface and/or mass data storage of the vehicle control system. In some implementations, the present invention implements a powertrain control system 532 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be embodied in other control systems 540 of vehicle 530. Control system 540 may likewise receive signals from input sensors 542 and/or output control signals to one or more output devices 544. In some implementations, control system 540 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 532 may communicate with mass data storage 546 that stores data in a nonvolatile manner. Mass data storage 546 may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". Powertrain control system 532 may be connected to memory 547 such as RAM, ROM, low latency nonvolatile memory such as flash memory and/or other suitable electronic data storage. Powertrain control system 532 also may support connections with a WLAN via a WLAN network interface 548. The control system 540 may also include mass data storage, memory and/or a WLAN interface (all not shown).

Figure 6E:
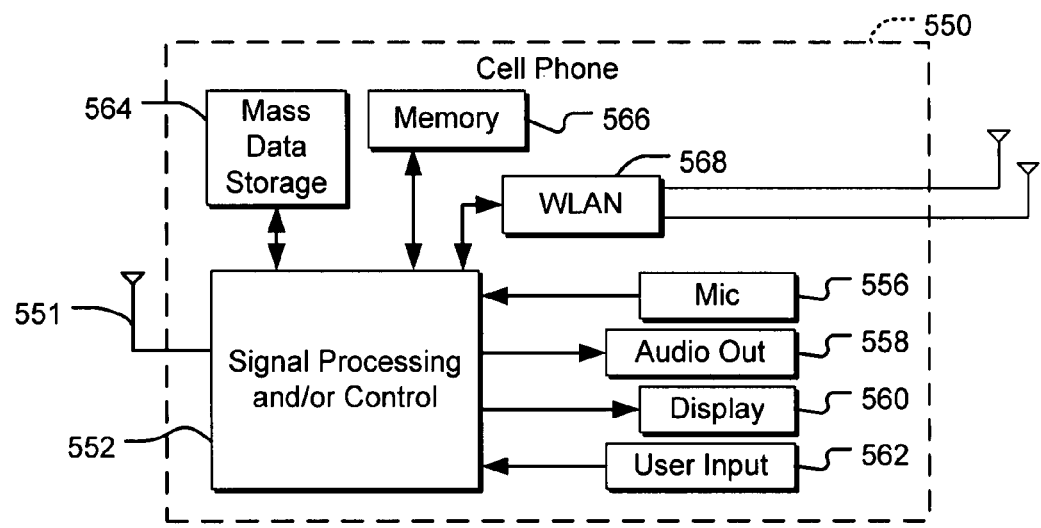
FIG. 6E is a block diagram showing an embodiment of the invention in a cellular or mobile phone.

Referring now to FIG. 6E, the present invention may be embodied as a wireless device in a cellular phone 550 that may include a cellular antenna 551. The present invention may implement either or both signal processing and/or control circuits, which are generally identified in FIG. 6E at 552, a WLAN interface and/or mass data storage of the cellular phone 550. In some implementations, cellular phone 550 includes a microphone 556, an audio output 558 such as a speaker and/or audio output jack, a display 560 and/or an input device 562 such as a keypad, pointing device, voice actuation and/or other input device. Signal processing and/or control circuits 552 and/or other circuits (not shown) in cellular phone 550 may process data, perform coding and/or encryption, perform calculations, format data and/or perform other cellular phone functions.

Cellular phone 550 may communicate with mass data storage 564 that stores data in a nonvolatile manner such as optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". Cellular phone 550 may be connected to memory 566 such as RAM, ROM, low latency nonvolatile memory such as flash memory and/or other suitable electronic data storage. Cellular phone 550 also may support connections with a WLAN via a WLAN network interface 568.

Figure 6F:
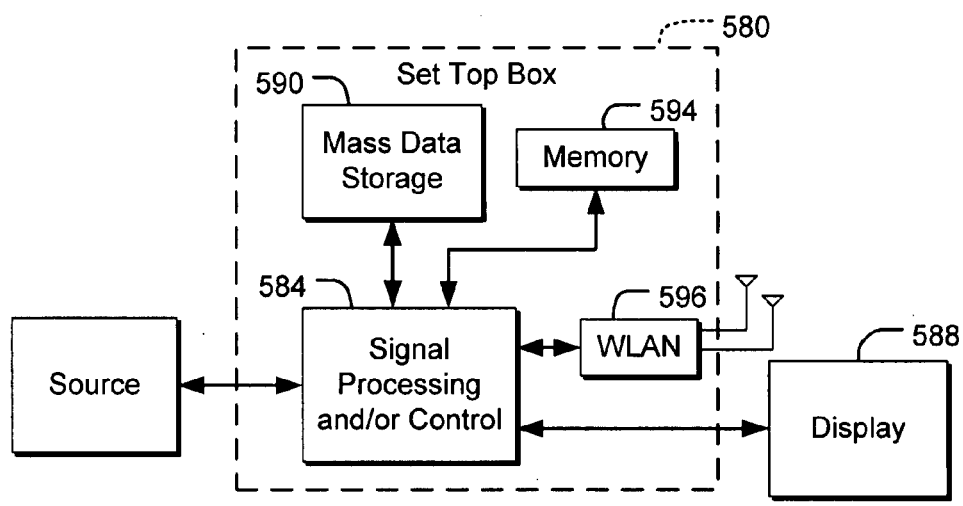
FIG. 6F is a block diagram showing an embodiment of the invention in a set-top box (STB).

Referring now to FIG. 6F, the present invention may be embodied as a wireless device in a set top box 580. The present invention may implement either or both signal processing and/or control circuits, which are generally identified in FIG. 6F at 584, a WLAN interface and/or mass data storage of the set top box 580. Set top box 580 receives signals from a source such as a broadband source and outputs standard and/or high definition audio/video signals suitable for a display 588 such as a television and/or monitor and/or other video and/or audio output devices. Signal processing and/or control circuits 584 and/or other circuits (not shown) of the set top box 580 may process data, perform coding and/or encryption, perform calculations, format data and/or perform any other set top box function.

Set top box 580 may communicate with mass data storage 590 that stores data in a nonvolatile manner. Mass data storage 590 may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". Set top box 580 may be connected to memory 594 such as RAM, ROM, low latency nonvolatile memory such as flash memory and/or other suitable electronic data storage. Set top box 580 also may support connections with a WLAN via a WLAN network interface 596.

Figure 6G:
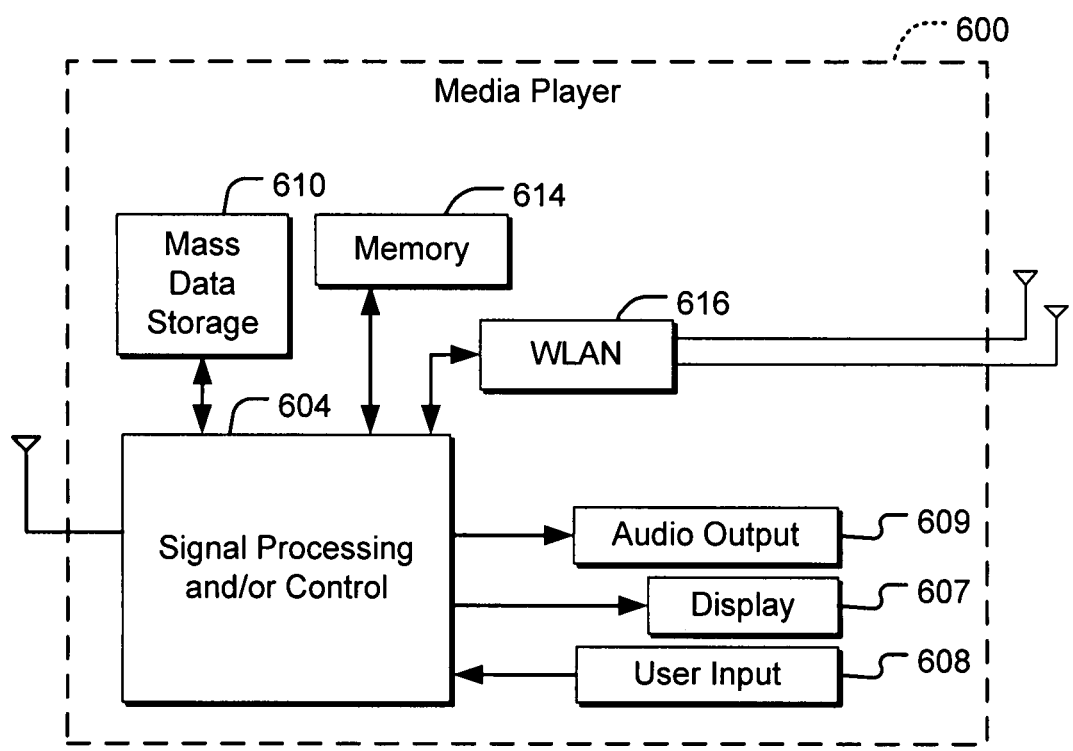
FIG. 6G is a block diagram showing an embodiment of the invention in a media player.

Referring now to FIG. 6G, the present invention may be embodied as a wireless device in a media player 600. The present invention may implement either or both signal processing and/or control circuits, which are generally identified in FIG. 6G at 604, a WLAN interface and/or mass data storage of the media player 600. In some implementations, media player 600 includes a display 607 and/or a user input 608 such as a keypad, touchpad and the like. In some implementations, media player 600 may employ a graphical user interface (GUI) that typically employs menus, drop down menus, icons and/or a point-and-click interface via display 607 and/or user input 608. Media player 600 further includes an audio output 609 such as a speaker and/or audio output jack. Signal processing and/or control circuits 604 and/or other circuits (not shown) of media player 600 may process data, perform coding and/or encryption, perform calculations, format data and/or perform any other media player function.

Media player 600 may communicate with mass data storage 610 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". Media player 600 may be connected to memory 614 such as RAM, ROM, low latency nonvolatile memory such as flash memory and/or other suitable electronic data storage. Media player 600 also may support connections with a WLAN via a WLAN network interface 616. Still other implementations in addition to those described above are contemplated.

Inventions herein have been described above with respect to particular illustrative embodiments. It is understood that the inventions are not limited to the above-described embodiments and that various changes and modifications may be made by those skilled in the relevant art based on the descriptions contained herein without departing from the spirit and scope of the inventions.

What is claimed is:

1. A wireless device, comprising:
a first radio channel including transmit capabilities and receive capabilities respectively configured for transmission and reception of data, with a first access point in a wireless local area network, over a first channel associated with the first access point, wherein the transmission and reception of data over the first channel is implemented pursuant to a protocol for data transmission and reception as defined by a wireless standard, and wherein the wireless standard further defines a scanning protocol for searching for access points within the wireless local area network;
a second radio channel including only receive capabilities configured to scan, pursuant to the scanning protocol defined by the wireless standard, for a second access point over a second channel associated with the second access point, wherein the second radio channel (i) is separate from the first radio channel and (ii) does not include a transmitter due to the second radio channel including only receive capabilities, wherein the second radio channel is further configured to scan for the second access point pursuant to a configurable channel list, wherein the configurable channel list indicates (i) a first group of channels that are enabled to be scanned by the second radio channel, (ii) a second group of channels that are not enabled to be scanned by the second radio channel, and (iii) for each channel in the first group of channels, an indication of a corresponding time period for scanning the corresponding channel in the first group of channels, and wherein the second channel is included in the first group of channels; and
a controller configured to facilitate a handoff procedure to switch the transmission and reception of data over the first channel associated with the first access point to the second channel associated with the second access point.

2. The wireless device according to claim 1, wherein the second radio channel is further configured to, prior to an initiation of the handoff procedure, scan for the second access point.

3. The wireless device according to claim 1, wherein:
the second radio channel is configured to scan for the second access point by passively listening for a transmission from the second access point on the second channel; and
the second radio channel is configured to passively listen for the transmission from the second access point on the second channel while the first radio channel simultaneously transmits and receives data over the first channel.

4. The wireless device according to claim 1, wherein for said each channel in the first group of channels, the indication of the corresponding time period for scanning the corresponding channel in the first group of channels is configurable.

5. The wireless device according to claim 1, wherein the configurable channel list includes a configurable time period to wait between scanning of the channels in the first group of channels.

6. The wireless device according to claim 1, wherein the wireless device maintains a channel database that includes the configurable channel list and an indication of presence of usable frames in individual channels included in the configurable channel list and wherein the channel database is updated pursuant to scanning activities of the second radio channel.

7. The wireless device according to claim 6, wherein:
the wireless device further comprises an interface to a host device; and
the channel database is communicated to the host device over the interface.

8. The wireless device according to claim 1, wherein the second radio channel pre-authorizes the wireless device for data communication with other access points in the wireless network.

9. The wireless device according to claim 1, wherein:
the first radio channel is associated with a main antenna;
the second radio channel is associated with an auxiliary antenna; and
the auxiliary antenna is physically smaller than the main antenna.

10. The wireless device according to claim 1, wherein the second radio channel is configured to, while scanning pursuant to the scanning protocol defined by the wireless standard, scan for access points within the wireless local area network, wherein each access point is scanned for an amount of time that is configurable by the controller.

* * * * *